US012811326B2

(12) United States Patent
Greiner et al.

(10) Patent No.: US 12,811,326 B2
(45) Date of Patent: Nov. 24, 2026

(54) METHOD FOR SURFACE TREATMENT OF AN ELECTRICAL CONTACT ELEMENT AND CONTACT ELEMENT

(71) Applicant: TE Connectivity Germany GmbH, Bensheim (DE)

(72) Inventors: Felix Greiner, Bensheim (DE); Stefan Thoss, Bensheim (DE); Michael Leidner, Speyer (DE); Frank Ostendorf, Bensheim (DE); Helge Schmidt, Speyer (DE); Esteban Sanchez, Speyer (DE); Stefan Job, Speyer (DE)

(73) Assignee: TE Connectivity Germany GmbH, Bensheim (DE)

( * ) Notice: Subject to any disclaimer, the term of this patent is extended or adjusted under 35 U.S.C. 154(b) by 579 days.

(21) Appl. No.: 17/989,919

(22) Filed: Nov. 18, 2022

(65) Prior Publication Data

US 2023/0155310 A1 May 18, 2023

(30) Foreign Application Priority Data

Nov. 18, 2021 (DE) ........................ 102021130188.2

(51) Int. Cl.
*H01R 13/03* (2006.01)

(52) U.S. Cl.
CPC ......... *H01R 13/03* (2013.01); *H01R 2201/26* (2013.01)

(58) Field of Classification Search
CPC ........................... H01R 13/03; H01R 2201/26
USPC ......................................................... 439/888
See application file for complete search history.

(56) References Cited

U.S. PATENT DOCUMENTS 1,654,509 A * 12/1927 Claus ...................... F16C 33/14 29/DIG. 39
3,482,202 A * 12/1969 Hamilton, Jr. ........... H01H 1/60 29/879
4,268,568 A * 5/1981 Sard ......................... H01H 1/60 428/209
4,320,251 A * 3/1982 Narasimhan ....... H10D 64/0111 438/606
5,620,552 A * 4/1997 Denney ..................... C23C 4/12 156/272.4
6,183,886 B1 * 2/2001 Chen ..................... C23C 28/021 428/658

(Continued)

FOREIGN PATENT DOCUMENTS

CN 101915127 A 12/2010
CN 105431232 A 3/2016

(Continued)

OTHER PUBLICATIONS

German Office Action, Application No. 10 2021 130 188.2, Dated: Aug. 5, 2022, 81 pages.

(Continued)

*Primary Examiner* — Tulsidas C Patel
(74) *Attorney, Agent, or Firm* — Barley Snyder

(57) ABSTRACT

A method for treating an electrically conductive contact element includes applying a lubricant to at least a partial region of a contact surface of the electrically conductive contact element. The contact surface is metallic. The contact surface is changed by plasma treatment to produce a coating of a solid lubricant on the partial region of the contact surface.

20 Claims, 3 Drawing Sheets

(56) References Cited

U.S. PATENT DOCUMENTS

| | | | | |
|---|---|---|---|---|
| 6,294,261 | B1 * | 9/2001 | Sangeeta | C23C 10/18 416/241 B |
| 9,590,340 | B2 * | 3/2017 | Blumenschein | H01R 13/05 |
| 11,239,593 | B2 * | 2/2022 | Leidner | H01R 13/03 |
| 2003/0176055 | A1 * | 9/2003 | Wu | H01L 21/7682 438/618 |
| 2003/0219622 | A1 * | 11/2003 | Niebauer | H01R 13/03 428/929 |
| 2005/0106408 | A1 * | 5/2005 | Chen | C23C 28/021 428/673 |
| 2005/0158511 | A1 * | 7/2005 | Sabol | F23R 3/007 428/131 |
| 2007/0111031 | A1 * | 5/2007 | Isberg | H01H 1/02 428/457 |
| 2007/0163638 | A1 * | 7/2007 | Van Duren | B22F 9/04 257/E31.007 |
| 2007/0163639 | A1 * | 7/2007 | Robinson | H01L 31/0749 257/E31.007 |
| 2007/0264523 | A1 * | 11/2007 | Hu | C22C 19/058 420/444 |
| 2007/0296129 | A1 * | 12/2007 | Fork | H01R 13/03 267/182 |
| 2008/0121277 | A1 * | 5/2008 | Robinson | H01L 31/18 257/E31.007 |
| 2010/0086702 | A1 * | 4/2010 | Blankenship | B23K 35/0255 427/532 |
| 2010/0124616 | A1 * | 5/2010 | Rosenzweig | C23C 4/18 427/535 |
| 2014/0102594 | A1 | 4/2014 | Schulte | |
| 2014/0162506 | A1 * | 6/2014 | De Cloet | H01B 1/02 174/126.2 |
| 2016/0276141 | A1 * | 9/2016 | Sun | C04B 41/009 |
| 2017/0331212 | A1 * | 11/2017 | Dören | C25D 7/00 |
| 2019/0173214 | A1 * | 6/2019 | Leidner | H01R 13/03 |
| 2019/0210879 | A1 * | 7/2019 | Mori | C23C 16/511 |
| 2019/0362865 | A1 * | 11/2019 | Inoue | H01B 1/026 |
| 2020/0035463 | A1 * | 1/2020 | Sun | H01J 37/32495 |
| 2020/0119468 | A1 * | 4/2020 | Tanaka | H01R 43/005 |
| 2021/0066834 | A1 * | 3/2021 | Myers | H01R 43/00 |
| 2021/0075162 | A1 * | 3/2021 | Kim | C08L 67/00 |
| 2021/0108325 | A1 * | 4/2021 | Mawatari | C25D 5/611 |
| 2021/0254230 | A1 * | 8/2021 | Stadler | H01R 13/03 |
| 2021/0310116 | A1 * | 10/2021 | Hamblin-Smith | B32B 15/01 |
| 2021/0316398 | A1 * | 10/2021 | Chen | B22F 7/08 |
| 2024/0145966 | A1 * | 5/2024 | Liu | C23C 10/28 |
| 2024/0145967 | A1 * | 5/2024 | Wang | C25D 5/12 |
| 2024/0174937 | A1 * | 5/2024 | Voevodin | C23C 24/10 |
| 2024/0263335 | A1 * | 8/2024 | Oberst | C23C 14/0623 |

FOREIGN PATENT DOCUMENTS

| | | | |
|---|---|---|---|
| CN | 110228251 | A | 9/2019 |
| CN | 110643991 | A | 1/2020 |
| CN | 110870142 | A | 3/2020 |
| CN | 111500996 | A | 8/2020 |
| DE | 1639075 | A | 1/1971 |
| DE | 3509022 | A1 | 11/1985 |
| DE | 102016214693 | B4 | 5/2018 |
| DE | 112017004743 | T5 | 6/2019 |
| JP | H0237462 | U | 3/1990 |
| JP | 2002343168 | A | 11/2002 |
| JP | 2010121211 | A | 6/2010 |
| JP | 2012057212 | A | 3/2012 |
| JP | 2015501071 | A | 1/2015 |
| JP | 2016539250 | A | 12/2016 |
| JP | 2019525421 | A | 9/2019 |
| WO | 0044032 | A | 7/2000 |
| WO | 2013004515 | A1 | 1/2013 |
| WO | 2018024778 | A1 | 2/2018 |
| WO | 2018029179 | A1 | 2/2018 |

OTHER PUBLICATIONS

Japanese Office Action dated Dec. 5, 2023, corresponding to Application No. 2022-182311, 5 pages.

Japanese Notice of Reasons for Refusal dated May 7, 2024 with English translation, corresponding to Application No. 2022-182311, 7 pages.

Korean Office Action dated Apr. 29, 2024 with English translation, corresponding to Application No. 10-2022-0153503, 12 pages.

Extended European Search Report from the European Patent Office dated Apr. 14, 2023, corresponding to Application 22208081.4-1201, 14 pages.

First Chinese Office Action dated Jul. 19, 2024 with English translation, corresponding to Application No. 202211432896.1, 19 pages.

European Patent Office Communication dated Mar. 24, 2025, corresponding to Application No. 22 208 081.4-1201, 10 pages.

Korean Office Action dated Feb. 28, 2025 with English translation, corresponding to Application No. 10-2022-0153503, 8 pages.

Indian Office Action dated Nov. 14, 2025, corresponding to Application No. 202244065413, 3 pages.

* cited by examiner

METHOD FOR SURFACE TREATMENT OF AN ELECTRICAL CONTACT ELEMENT AND CONTACT ELEMENT

CROSS-REFERENCE TO RELATED APPLICATION

This application claims the benefit of the filing date under 35 U.S.C. § 119(a)-(d) of German Patent Application No. 102021130188.2, filed on Nov. 18, 2021.

FIELD OF THE INVENTION

The present invention relates to a method for surface treatment of an electrically conductive contact element for an electrical connector. Furthermore, the invention relates to an electrically conductive contact element whose surface is treated by such a method.

BACKGROUND

Electrical connectors and their contact elements are known in numerous designs. Electrical connectors are intended to be mated with a suitable mating connector to establish an electrical connection. Electrical connectors are generally used either for signal transmission or for power transmission. For this purpose, electrical connectors generally have electrically conductive contact elements that come into contact with a contact element of the mating connector when the connector is mated. Frequently, the contact elements of one connector element are designed as contact pins and those of the mating connector as contact springs. When the connector and mating connector are mated, the contact springs exert elastic spring forces on the contact pins to ensure a reliable electrically conductive connection.

Electrical connectors are used in motor vehicles, for example, to transmit power and network electrical and electronic systems. In motor vehicles, connectors are exposed to strong temperature fluctuations, vibrations, moisture, and corrosive media. An increase in operating temperatures results in increased wear, particularly in the case of the widely used tin-plated copper-based contact elements.

In particular, base metal contact surfaces, e.g. with tin, nickel or their alloys, have a tendency to fretting corrosion ("fretting" or "scuffing") in the event of small relative movements. Furthermore, in the case of high-pole connectors, the mating forces are often outside the required forces, especially during initial mating, and in the case of noble contact surfaces, e.g. noble metal-based, the tendency to cold welding represents a known problem.

In addition to high wear resistance, low mating and drawing forces are therefore required to facilitate the assembly and maintenance of connectors. To increase occupational safety, the specified mating force must not exceed certain limits, especially during initial mating.

In addition, partial abrasion takes place on the contact surface of a contact element during mating of a connector with a mating connector. This wear caused by abrasion limits the mating frequency of connectors and thus reduces their operating times.

The German patent specification DE 10 2016 214 693 B4 describes an electrical contact element of a connector in which caverns filled with an auxiliary material are arranged under the contact surface. The contact surface was previously textured by laser irradiation. After the connector has been mated for the first time into a mating connector, the caverns break open causing the auxiliary material to escape and to cover the contact surface with a lubricating film. This lubricating film results in reduced mating force when the connector is mated again. The treatment of a surface with an interference pattern from laser radiation, in which exemplarily a dimpled structure is created, is referred to below as a textured surface.

However, assembly boundary conditions also define standards for the mating force when the connector is first mated with a mating connector. This initial mating force is of particular importance when assembling connectors with a high number of contacts. There is an additional requirement for the contact surface of the connector to be heat-resistant, as the connectors can also be further processed in warm regions. Applying a lubricating film to the contact surface of the connector is therefore not a suitable solution, as the lubricating film would evaporate at warm temperatures.

Therefore, there is a need for a cost-effective and reliable process that treats the contact surface of an electrical connector in such a way that the initial mating force can be reduced when mating with a mating connector, and the surface treatment does not lose its effect even under adverse environmental conditions.

SUMMARY

A method for treating an electrically conductive contact element includes applying a lubricant to at least a partial region of a contact surface of the electrically conductive contact element. The contact surface is metallic. The contact surface is changed by plasma treatment to produce a coating of a solid lubricant on the partial region of the contact surface.

BRIEF DESCRIPTION OF THE DRAWINGS

The invention may be understood by reference to the following description taken in conjunction with the accompanying figures, in which.

DETAILED DESCRIPTION OF THE EMBODIMENT(S)

The present invention will be explained in more detail with reference to the examples of embodiments shown in the figures. In this context, identical parts are provided with identical reference signs and identical component designations. Furthermore, some features or combinations of features from the different embodiments shown and described may also represent independent, inventive solutions or solutions according to the invention.

Figure 1:
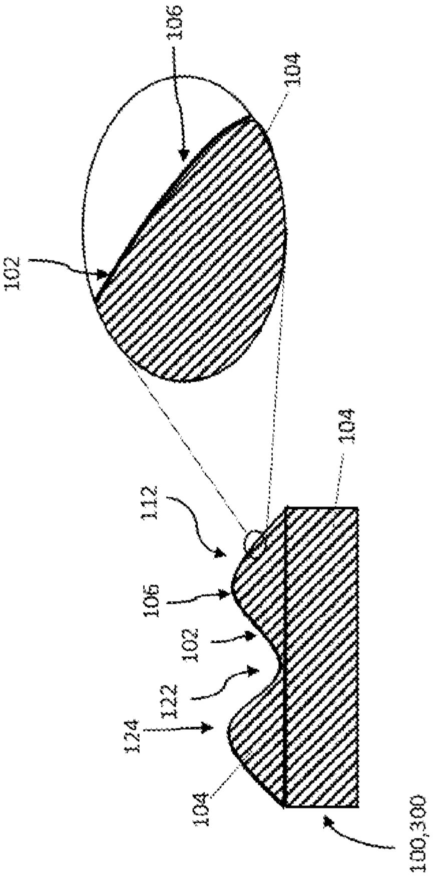
FIG. 1 is a schematic sectional view of a contact surface in a process step of a method according to an embodiment.

FIG. 1 shows, at a contact surface of an electrically conductive contact element, a first process step according to a method according to the invention. The method is for surface treating an electrically conductive contact element 100. The contact element 100 for an electrical connector 300 is electrically conductive and comprises a base material 104.

The base material 104 may comprise, for example, tin, nickel, silver, copper or alloys of tin, nickel, silver, copper and/or other elements. One side of the contact element 100 forms a metallic contact surface 102. The contact surface 102 comes into contact with the contact surface of the mating connector when the connector 300 is mated to a mating connector.

The contact surface 102 is coated on at least a partial region thereof with a lubricant 106, shown in FIG. 1. For example, the lubricant 106 may comprise oil, grease, a paste, an acid, or another solid lubricant such as graphite, carbon nanotubes, $MoS_2$, or mixtures thereof. The thickness of the applied lubricant may have values between 0.1 μm and 5 μm.

In an embodiment, the contact surface 102 of the contact element 100 may have a surface texture 112 of elevations 124 and recesses 122. These elevations 124 and recesses 122 may be formed periodically alternating at least in sections. In this regard, the recesses 122 form trenches and the elevations 124 form walls between them. The elevations 124 may be in the order of 0.1 μm to 2 μm, by way of example. However, it is by no means necessary for the method according to the invention that the surface texture 112 comprises elevations 124 and recesses 122. It is understood that the contact surface 102 may have any surface texture 112, such as smooth or with other roughness.

Figure 2:
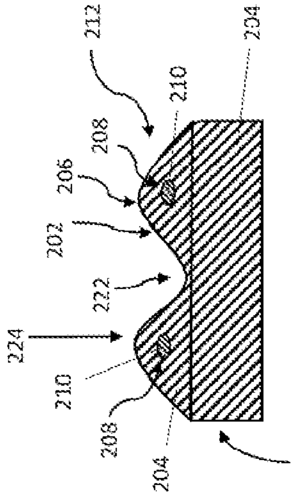
FIG. 2 is a schematic sectional view of a contact surface in a process step of a method according to another embodiment.

FIG. 2 shows another embodiment of a contact surface 102 of an electrically conductive contact element 200 in a first process step according to a method according to the invention. The contact element 200 for an electrical connector 400 is electrically conductive and comprises a base material 204. The base material 204 may comprise, for example, tin, nickel, silver, copper or alloys of tin, nickel, silver, copper and/or other elements. One side of the contact element 200 forms a metallic contact surface 202, and the contact surface 202 comes into contact with the contact surface of the mating connector when the connector 400 is mated with a mating connector.

In the embodiment shown, caverns 208 are enclosed under the contact surface 202 and are filled with an auxiliary material 210. Due to the fact that the filled caverns 208 are located under the contact surface, negative effects such as gumming can be avoided. In addition, undesirable losses of the auxiliary material 210 due to the solid embedding are excluded. In the embodiment shown, the caverns 208 are spaced apart from each other at regular intervals under the contact surface 202. In this embodiment, the surface texture 212 has exemplary elevations 224 and recesses 222. These elevations 224 and recesses 222 may be formed periodically alternating, at least in sections. In this regard, the recesses 222 form trenches and the elevations 224 form walls between them. The elevations 224 can be in the order of 0.1 μm to 2 μm, by way of example.

These filled caverns 208 break open in the course of the first mating of the connector with a mating connector, allowing the auxiliary material 210 to escape and develop its effect. This allows the mating force to be reduced in the first mating process and even more so for all subsequent mating processes.

The arrangement of the caverns 208 below the contact surface 202 means that the caverns 208 do not have an outlet at the contact surface 202 or, at most, an outlet of such narrow dimensions that auxiliary material 210 filled into the caverns 208 cannot be reached without creating a breakthrough from the contact surface 202 into the cavern 208.

The caverns 208 may also be irregularly spaced from one another and at varying depths under the contact surface 202. Furthermore, it is also possible for the caverns 208 to be enclosed under the contact surface 202 if the contact surface 202 does not have elevations 224 and recesses 222. For the method according to the invention, it is not necessary that the surface texture 212 comprises elevations 224 and recesses 222. It is understood that the contact surface 202 may have any surface texture 212, such as smooth or with other roughness.

The auxiliary material 210 enclosed in the caverns 208 may comprise, for example, oil, grease, a paste, or another solid lubricant such as graphite, carbon nanotubes, $MoS_2$, or mixtures thereof. According to another advantageous embodiment of the present invention, the auxiliary material 210 is selected from the group consisting of antioxidants, corrosion inhibitors, lubricants, another solid lubricant, and acids. This group of substances facilitates, after leakage to the contact surface 202, the mating of this connector with a mating connector. The contact surface 202 is coated with a lubricant 206 on at least a partial region thereof. For example, the lubricant 206 may comprise oil, grease, a paste, an acid, or another solid lubricant such as graphite, carbon nanotubes, $MoS_2$, or mixtures thereof. The thickness of the applied lubricant may have values between 0.1 μm and 5 μm.

Figure 3:
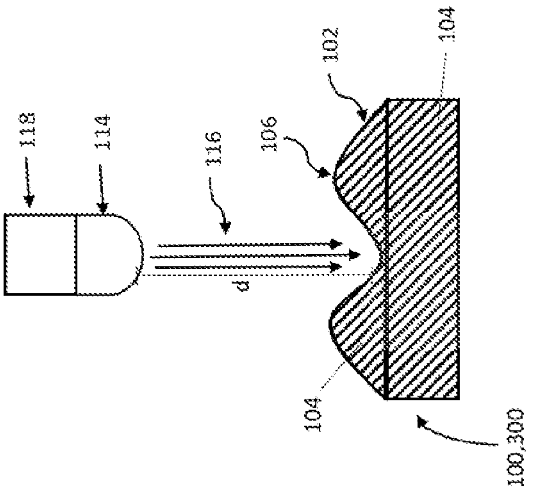
FIG. 3 is a schematic diagram of a surface treatment of the contact surface by plasma in a further process step.

FIG. 3 shows the contact element 100 according to a first embodiment in a further process step of the method according to the invention. The figure shows a schematic representation of the surface treatment of the contact element 100 using plasma. Plasma is understood to be partially or completely ionized gas. In one possible embodiment, a plasma generator 118, for controlling and monitoring the plasma system, is shown schematically with a plasma nozzle 114 directed at the material to be treated. The directed plasma nozzle 114 is used to generate and propagate the plasma, cold or hot. Various nozzle systems, such as single nozzles or rotating nozzles, can be used as plasma sources. From the plasma nozzle 114, a plasma flame 116 is used to treat the contact surface 102. The distance d of the plasma nozzle 114 to the contact surface 102 is in the range of 5 mm to 100 mm.

Inside the nozzle 114, the plasma is generated by high voltage between a stator and a rotor. Through an arc-like high-voltage discharge, the ionized gas is directed onto the surface to be treated. For example, hydrogen, argon, nitrogen or compressed air can be used as the gas to be ionized.

In this process, it is possible to generate the plasma flame 116 in a pressure range of 1 mbar to 8 bar, thus, for example, treatment of surfaces can also be carried out at atmospheric pressure. No vacuum chamber is required. This has the advantage that liquid chemicals can be dispensed with entirely. For this purpose, non-hazardous gases such as nitrogen or compressed air can be used for plasma generation. Alternatively, the plasma can be excited under low vacuum or slight overpressure.

The power of the plasma flame 116 is in a range of 50 W to 5 kW. In this case, the treatment of the contact surface 102 is part of a continuous process in which the contact element 100 passes through the plasma flame 116 at a speed of 100 mm/s or 200 mm/s, for example. The dwell time of the contact surface 102 under the plasma flame 116 is then between 5 ms and 500 ms. This has the advantage that the edges of the contact surface are also treated uniformly. As a result, a uniformly thin layer of a solid lubricant can advantageously be obtained, as a result of which the contact surface has a high degree of homogeneity.

It is clear, however, that the values given are only given by way of example and are intended to aid understanding, but in no way limit the invention to these values. Both the passage speed, the distance, and the dwell time can be adjusted as desired and can be adapted to different values of the power of the plasma flame 116.

Figure 4:
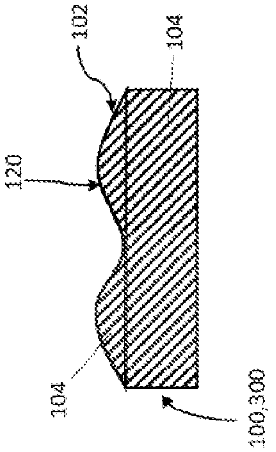
FIG. 4 is a schematic sectional view of the contact surface after plasma treatment.

FIG. 4 shows an exemplary first embodiment of a contact surface 102 of an electrically conductive contact element 100 after surface treatment with plasma. The plasma treatment has produced a coating 120 of a solid lubricant, in an embodiment carbon, on at least a partial region of the contact surface 102. The coating 120 of a solid lubricant can be, for example, carbon, carbonaceous, or sulfide-based. A carbon layer is understood to be a thin layer consisting predominantly of the chemical element carbon. This includes, for example, graphite layers or diamond-like carbon layers.

This coating 120 of a solid lubricant may have a thickness of 1 nm to 300 nm and may be transparent. At least part of the applied lubricant from the previous process step thus has been at least partially converted into a coating of a solid lubricant, in an embodiment consisting of carbon.

Figure 5:
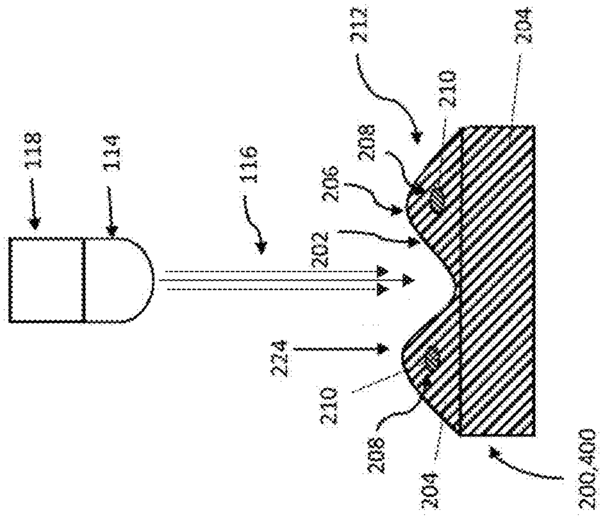
FIG. 5 is a schematic diagram of a surface treatment of the contact surface of FIG. 2 by plasma in a further process step.

In a second embodiment, as shown in FIG. 5, it is quite possible to likewise create a coating 120 of a solid lubricant on the contact surface 202 if, as in a previously mentioned second embodiment of the previous process step shown in FIG. 2, caverns filled with an auxiliary material are enclosed under the contact surface 202. The caverns remain unchanged by the plasma treatment.

Advantageously, in addition to the carbon or carbon-containing coating, the surface properties of the contact element can be improved by the plasma treatment. Accordingly, the treatment reduces unevenness in the contact surface 202, thus achieving a lower square roughness and greater homogeneity. Experimental investigations have shown that the square roughness of a surface after treatment with plasma is less than 0.3 μm. This value is 0.1 μm lower than the value of the square roughness for a surface not treated by the process according to the invention.

Surface roughness is the degree of unevenness of a solid surface below its shape or waviness, but above the irregularity of crystal lattice structures. Roughness can affect material properties such as friction. One of the roughness characteristics is the square roughness. This can be detected by optical measurement methods. The evaluation of the measurements was based on the DIN EN ISO 4287 and DIN EN ISO 11562 series of standards. For mating a connector with a mating connector, the roughness in the mating direction is of particular importance. Therefore, in the present case, the measurement is aligned to the mating direction. In one embodiment, this alignment can be made along the surface texture. If the surface texture has elevations and recesses, as in the above-mentioned embodiment, the alignment of the measurement takes place along the elevations and recesses.

Advantageously, a higher hardness of the coated surface can additionally be achieved, e.g. by selectively creating intermetallic phases IMPS or a nanocrystalline microstructure. The hardness of the connector surface can be determined by nanoidentification. An indenter with a known geometry is pressed into the surface to be tested with a defined force curve. When the specified maximum force is reached, the indenter is released again in a controlled manner. The indentation depth is recorded both during loading and unloading. Various parameters can be calculated from the applied force, the shape of the indenter and the indentation depth. For a measurement of the surface hardness, at least two measuring points are approached at a predefined distance. The mean value of all measuring points on a surface can be used as a comparable measure of surface hardness. The measurement is first performed on an untreated surface and then a second time after plasma treatment. In an exemplary measurement with 51 measuring points at a distance of 100 μm, an exemplary average hardness value of 450 $N/mm^2$ can be determined for the untreated surface. However, for a textured and plasma-treated surface, an exemplary mean value of 750 $N/mm^2$ can be determined.

Thus, surfaces exhibit a higher hardness after plasma treatment. When comparing the mean values, an increase in hardness of 40% to 80% can be observed in particular for contact surfaces textured before plasma treatment compared to untreated surfaces.

Finally, a spatially resolved characterization of the plasma-treated surface in terms of roughness, hardness and chemical composition can reveal a significantly more uniform image than contacts that have been stamped or electroplated, for example.

These advantageous properties occur independently of each other and lead independently of each other to a smaller variation of the coefficient of friction, reducing the initial mating force when mating the connector with a mating connector. Within a surface, a narrower distribution of the standard deviation of the coefficient of friction can thus be demonstrated by means of the method according to the invention.

It should be noted that it is quite possible to achieve the same advantageous properties using a different plasma generation method. For example, the plasma flame can be generated in a low-pressure plasma chamber under vacuum.

What is claimed is:

1. A method for treating an electrically conductive contact element, comprising:

applying a lubricant to at least a partial region of a contact surface of the electrically conductive contact element, the lubricant is one of an oil, a grease, a paste, or an acid, the contact surface is metallic; and changing the contact surface by plasma treatment to convert the lubricant into a coating of a solid lubricant on the partial region of the contact surface.

2. The method of claim 1, wherein the contact surface has a surface texture including a plurality of elevations and a plurality of recesses.

3. The method of claim 1, wherein a plasma in the plasma treatment is excited in a pressure range from 1 mbar to 8 bar.

4. The method of claim 1, wherein a power of a plasma in the plasma treatment is in a range of 50 W to 5 kW.

5. The method of claim 1, wherein the electrically conductive contact element has a plurality of caverns enclosed under the contact surface.

6. The method of claim 5, wherein the caverns are filled with an auxiliary material.

7. The method of claim 6, wherein the auxiliary material is selected from the group consisting of: antioxidants, corrosion inhibitors, lubricants, another solid lubricant, and acids.

8. The method of claim 1, wherein the plasma treatment in the changing step is part of a process in which the electrically conductive contact element passes through the plasma treatment.

9. The method of claim 1, wherein the plasma treatment includes irradiation with a plasma flame.

10. The method of claim 9, wherein a dwell time of the electrically conductive contact element in the plasma flame is between 5 ms and 500 ms.

11. The method of claim 9, wherein the plasma flame exits from a plasma nozzle.

12. The method of claim 11, wherein a distance of the contact surface to the plasma nozzle is 5 mm to 100 mm.

13. The method of claim 1, wherein the coating of the solid lubricant has a thickness of 1 nm to 300 nm.

14. The method of claim 1, wherein a thickness of the lubricant applied to the contact surface is between 0.1 μm and 5 μm.

15. An electrically conductive contact element, comprising:

a metallic contact surface having a coating of a solid lubricant produced by treatment of a lubricant layer with a plasma, the lubricant is one of an oil, a grease, a paste, or an acid, a square roughness of the metallic contact surface in a mating direction is less than 0.3 μm.

16. The electrically conductive contact element of claim 15, further comprising a plurality of caverns are disposed below the contact surface.

17. The electrically conductive contact element of claim 16, wherein the caverns are filled with an auxiliary material.

18. The electrically conductive contact element of claim 17, wherein the auxiliary material is selected from the group consisting of: antioxidants, corrosion inhibitors, lubricants, another solid lubricant, and acids.

19. The electrically conductive contact element of claim 15, wherein the metallic contact surface includes tin, and/or nickel, and/or silver, and/or copper, and/or alloys of tin, nickel, silver, and copper.

20. The method of claim 1, wherein the lubricant is applied to at least the partial region of the contact surface of the electrically conductive contact before changing the contact surface with the plasma treatment.

* * * * *